United States Patent
Benedict et al.

(10) Patent No.: US 9,810,806 B2
(45) Date of Patent: Nov. 7, 2017

(54) ELECTRONIC FRAME FOR USE WITH COUPLED CONDUIT SEGMENTS

(71) Applicants: Detlev Benedict, Celle (DE); Volker Peters, Wienhausen (DE); Rene Schulz, Lower Saxony (DE); Robert Buda, Lower Saxony (DE); Stephan Mueller, Hannover (DE); Ingo Roders, Seelze (DE); Henning Rahn, Celle (DE)

(72) Inventors: Detlev Benedict, Celle (DE); Volker Peters, Wienhausen (DE); Rene Schulz, Lower Saxony (DE); Robert Buda, Lower Saxony (DE); Stephan Mueller, Hannover (DE); Ingo Roders, Seelze (DE); Henning Rahn, Celle (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 484 days.

(21) Appl. No.: 13/724,416

(22) Filed: Dec. 21, 2012

(65) Prior Publication Data
US 2014/0176334 A1      Jun. 26, 2014

(51) Int. Cl.
G01V 3/00        (2006.01)
G01V 3/34        (2006.01)
E21B 47/01       (2012.01)
E21B 17/02       (2006.01)

(52) U.S. Cl.
CPC .............. *G01V 3/34* (2013.01); *E21B 17/028* (2013.01); *E21B 47/01* (2013.01)

(58) Field of Classification Search
CPC ........................................................ G01V 3/18
USPC ................................ 340/853.1, 854.3, 854.4
See application file for complete search history.

(56) References Cited

U.S. PATENT DOCUMENTS 4,788,544 A      11/1988   Howard
6,392,317 B1 *   5/2002    Hall et al. ........................ 307/90
6,727,827 B1 *   4/2004    Edwards ............... E21B 47/122
                                                          324/339
(Continued)

FOREIGN PATENT DOCUMENTS

WO         2012116984 A2       9/2012

OTHER PUBLICATIONS

Notification of Transmittal of the International Search Report and the Written Opinion of the International Searching Authority, or the Declaration; PCT/US2014/0035619; Mailing date: Aug. 21, 2014, 9 pages.

(Continued)

*Primary Examiner* — Amine Benlagsir
(74) *Attorney, Agent, or Firm* — Cantor Colburn LLP (57) ABSTRACT

An electronic frame for use in a downhole component coupling mechanism includes: a first frame element including at least one retaining structure configured to retain an electronic component; and a second frame element configured to be disposed at the first frame element, the second frame element permanently joined to the first frame element to isolate the electronic component from downhole fluids and form the electronic frame, the electronic frame configured to be disposed in a coupling assembly of a first downhole component and a second downhole component and constrained axially by the coupling assembly.

20 Claims, 8 Drawing Sheets

(56) References Cited

U.S. PATENT DOCUMENTS

| | | | |
|---|---|---|---|
| 7,098,802 B2 | 8/2006 | Hall et al. | |
| 7,139,218 B2 | 11/2006 | Hall et al. | |
| 7,207,396 B2 | 4/2007 | Hall et al. | |
| 7,224,288 B2 | 5/2007 | Hall et al. | |
| 7,253,745 B2 | 8/2007 | Hall et al. | |
| 7,525,315 B2* | 4/2009 | Fredette | E21B 47/01 324/339 |
| 8,091,627 B2 | 1/2012 | Hall et al. | |
| 8,242,928 B2 | 8/2012 | Prammer | |
| 2002/0193004 A1 | 12/2002 | Boyle | |
| 2005/0056415 A1 | 3/2005 | Zillinger | |
| 2007/0023185 A1* | 2/2007 | Hall et al. | 166/255.1 |
| 2008/0230232 A1 | 9/2008 | Farrara | |
| 2009/0014175 A1 | 1/2009 | Peter | |
| 2009/0058675 A1* | 3/2009 | Sugiura | G01V 11/002 340/854.8 |
| 2009/0151926 A1 | 6/2009 | Hall et al. | |
| 2009/0289808 A1* | 11/2009 | Prammer | E21B 17/003 340/853.7 |
| 2010/0071188 A1 | 3/2010 | Madhavan et al. | |
| 2010/0097890 A1 | 4/2010 | Sullivan et al. | |
| 2010/0300677 A1 | 12/2010 | Patterson et al. | |
| 2012/0111555 A1 | 5/2012 | Leveau et al. | |
| 2012/0125686 A1 | 5/2012 | Hogseth et al. | |
| 2014/0332235 A1 | 11/2014 | Mueller et al. | |
| 2015/0060041 A1 | 3/2015 | Mueller et al. | |

OTHER PUBLICATIONS

Wassermann, et al. "How High-Speed Telemetry Affects the Drilling Process", Technology Update, JPT, Jun. 2009. 4 pages.

Notification of Transmittal of the International Search Report and the Written Opinion of the International Searching Authority, or the Declaration; PCT/US2013/074979, Mailed Mar. 26, 2014, 11 pages.

For the American Heritage Dictionary Defination: in. (n.d.) American Heritage Dictionary of the English Language, Fifth Edition. (2011). Retreived May 9, 2016 from http://www.thefreedictionary.com/in.

For the American Heritage Dictionary definiation : at. (n.d.) American Heritage Dictionary of the English Language, Fifth Ediction. (2011). Retreived May 9, 2016 from http://www.thefreedictionary.com/in.

* cited by examiner

ELECTRONIC FRAME FOR USE WITH COUPLED CONDUIT SEGMENTS

BACKGROUND

During subterranean drilling and completion operations, various power and/or communication signals may be transmitted through pipe segments or other downhole components, e.g., via a "wired pipe" configuration. Such configurations include electrical, optical or other conductors extending along the length of selected pipe segments. The conductors are operably connected between pipe segments by a variety of coupling configurations.

One such coupling configuration includes a threaded male-female configuration often referred to as a pin box connection. The pin box connection includes a male member, i.e., a "pin" that includes an exterior threaded portion, and a female member, i.e., a "box", that includes an interior threaded portion and is configured to receive the pin in a threaded connection.

Signal repeaters have been used to enhance transmission of power and communications between components over a telemetry line or system. Such repeaters are provided to reduce signal loss during transmission of data from downhole components to the surface.

SUMMARY

An electronic frame for use in a downhole component coupling mechanism includes: a first frame element including at least one retaining structure configured to retain an electronic component; and a second frame element configured to be disposed at the first frame element, the second frame element permanently joined to the first frame element to isolate the electronic component from downhole fluids and form the electronic frame, the electronic frame configured to be disposed in a coupling assembly of a first downhole component and a second downhole component and constrained axially by the coupling assembly.

A method of coupling downhole components includes: disposing an electronic component in at least one retaining structure of a first frame element of an electronic frame, the electronic component configured to facilitate transmission of signals between a first downhole component and a second downhole component; permanently joining a second frame element to the first frame element to form an electronic frame and isolate the electronic component from downhole fluids; disposing the electronic frame in a coupling assembly of a first downhole component and a second downhole component; and coupling the first downhole component to the second downhole component and axially constraining the electronic frame by the coupling assembly, wherein coupling includes communicatively connecting the first downhole component to the second downhole component via the electronic frame.

BRIEF DESCRIPTION OF THE DRAWINGS

The following descriptions should not be considered limiting in any way. With reference to the accompanying drawings, like elements are numbered alike:

FIGS. 5A-4C (collectively referred to as FIG. 5) depict an embodiment of an electronic frame for electronically coupling downhole components;

DETAILED DESCRIPTION

There is provided an electronic housing or frame for use with downhole components, such as downhole tools, drill pipes and subassemblies. The frame is provided to house electronic components such as repeater electronics and power supplies within a pressure-sealed and mechanically robust frame that can be mounted at, near or within a coupling configuration (e.g., the pin and/or box portion of a pin-box connector). In one embodiment, the frame includes a first frame element that includes retaining structures for electronic components, and a second frame element that is welded or otherwise permanently joined to the first frame element to isolate the electronic components from downhole fluid or other conditions.

Figure 1:
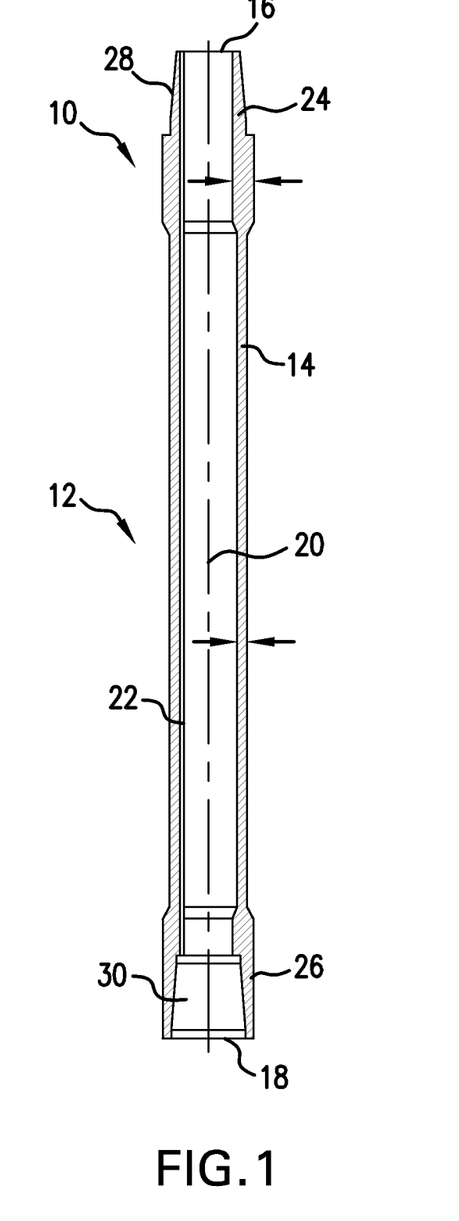
FIG. 1 depicts an embodiment of a conduit segment of a downhole system.

Referring to FIG. 1, an exemplary embodiment of a portion of a well drilling, logging, completion and/or production system 10 includes a conduit or string 12, such as a drillstring or production string, that is configured to be disposed in a borehole for performing operations such as drilling the borehole, making measurements of properties of the borehole and/or the surrounding formation downhole, and facilitating hydrocarbon production.

The string 12 includes at least one string component, such as a pipe segment 14, having a first end 16 and a second end 18. An inner bore or other conduit 20 extends along the length of each segment 14 to allow drilling mud or other fluids to flow therethrough. A communication conduit 22 is located within the segment 14 to provide protection for electrical, optical or other conductors to be disposed along the segment 14. Although the string component is described as a pipe segment, it is not so limited. The string component may be any type of downhole component or carrier that includes a coupling mechanism for coupling the downhole component to another component.

The term "carrier" as used herein means any device, device component, combination of devices, media and/or member that may be used to convey, house, support or otherwise facilitate the use of another device, device component, combination of devices, media and/or member. Exemplary non-limiting carriers include wireline or logging-while-drilling tools, wire pipe, drill strings of the jointed pipe type and any combination or portion thereof.

Other carrier examples include casing pipes, wirelines, wireline sondes, slickline sondes, drop shots, downhole subs and BHA's.

The segment 14 includes a coupling assembly having at least one of a first coupling 24 and a second coupling 26. The first coupling 24 includes a male coupling portion 28 having an exterior threaded section, and is referred to herein as a "pin" 24. The second coupling 26 includes a female coupling portion 30 having an interior threaded section, and is referred to herein as a "box" 26.

The pin 24 and the box 26 are configured so that the pin 24 can be disposed within the box 26 to affect a fixed connection therebetween to connect the segment 14 with an adjacent segment 14 or other downhole component. In one embodiment, the exterior of the male coupling portion 28 and the interior of the female coupling portion 30 are tapered along the length of the segment 14 to facilitate coupling. Although the pin 24 and the box 26 are described has having threaded portions, the pin 24 and the box 26 may be configured to be coupled using any suitable mechanism, such as bolts or screws or an interference fit.

Figure 2:
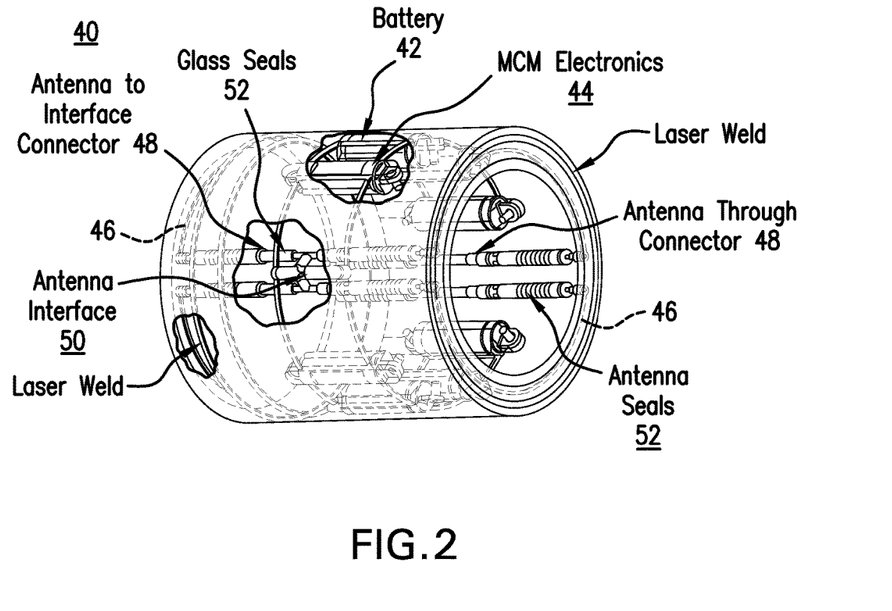
FIG. 2 depicts an embodiment of an electronic frame housing various electronic components.

FIG. 2 illustrates an embodiment of a pressure-sealed and mechanically robust electronic frame 40 configured to be disposed within a coupling assembly between downhole components, e.g., within a space formed within the pin 24 and/or the box 26. In one embodiment, the electronic frame includes electronics configured to facilitate wired pipe telemetry or other communications. The frame is mechanically distinct and separate from the coupling assembly and the downhole components, and is configured to be secured at least axially based on encapsulation of the frame by the coupling assembly and/or the downhole components. Thus, the frame does not need to be directly sealed or adhered to the connection/components, but rather can rely upon the already existing sealing engagement between the components (e.g., the box-pin connection).

As shown in FIG. 2, the frame 40 is configured to support electronics for drill pipes, downhole tools and other downhole components. Exemplary electronics include repeater electronics of a signal transmission system configured to transmit power and/or communications between downhole components. For example, the frame 40 includes recesses, chambers or other retaining structures to house repeater components (e.g., electronics and sealing components) for transmitting signals between components. Such exemplary repeater components include batteries 42, control electronics 44 such as multi-chip modules (MCMs), and signal coupling elements 46 such as coupler rings, antennas, electrical contacts and inductive coupling elements. The coupling element may be of any suitable type, such as an inductive coil, direct electrical contacts and an optical connection ring. Other exemplary components include transmission components such as connectors 48, interfaces 50 and various sealing components 52 such as glass seals and antenna seals.

FIG. 3 illustrates an embodiment of the electronic frame 40 in various stages of assembly with the coupling assembly. As demonstrated in FIG. 3, in some embodiments, the frame 40 is separate and removable from the coupling mechanism and is shaped or otherwise configured to sit within a portion of the coupling mechanism and held axially in place by the coupling mechanism without requiring any additional connection or securing features. FIG. 3A shows the frame 40 prior to assembly. FIG. 2B shows the frame 40 disposed or mounted within an elongated box bore-back 54. The bore-back 54 typically includes a reduction of internal diameter behind the threaded portion of the box 26, and is generally provided to reduce stress concentrations during static and dynamic loading.

Figure 3A:
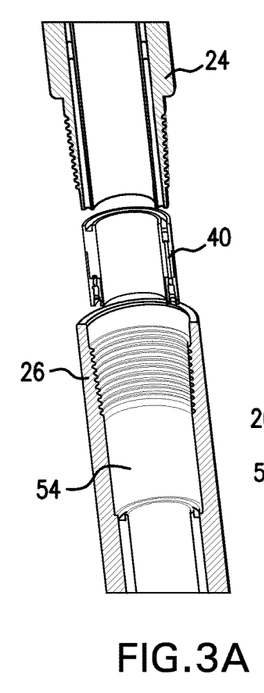
FIGS. 3A-3D (collectively referred to as FIG. 3) depict an exemplary electronic frame disposed in a coupling assembly of a first and second downhole component.
Figure 3B:
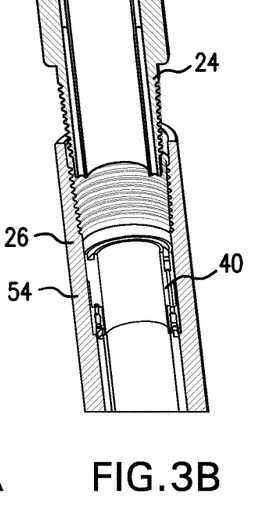
Figure 3C:
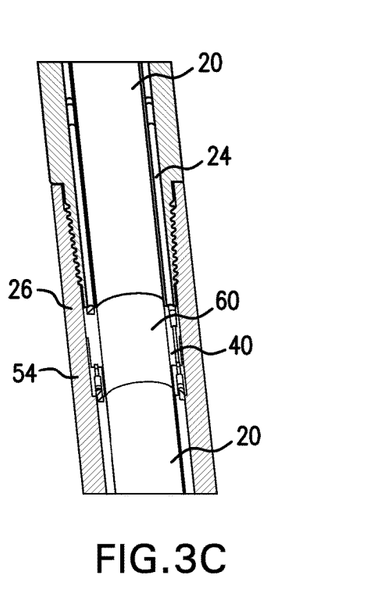
Figure 3D:
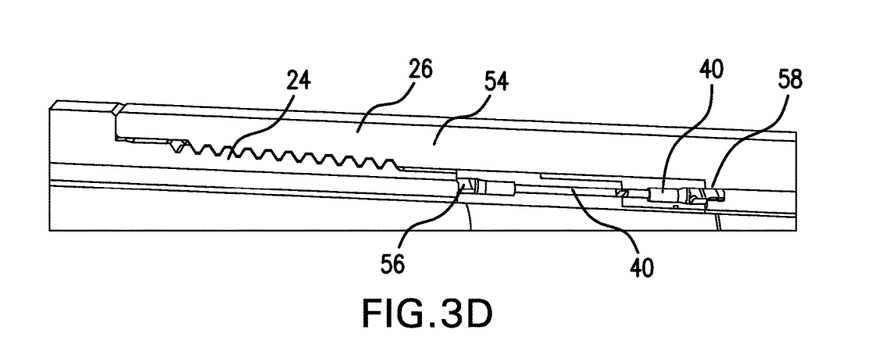

The frame 40 is not adhered to or rotationally fixed within the bore-back 54, although the frame 40 can be adhered or fixed if desired. FIGS. 3C and 3D show the frame 40 within a fully assembled coupling between downhole components (e.g., pipe segments 14). The frame 40 (or at least the outer diameter or surface of the frame 40) is entirely encapsulated within the string 12 and is held axially in place by, e.g., the pin face 56 and a shoulder 58 formed by the transition between the bore-back 54 and the main inner bore 20 of the string segment 14. The frame 40 is thus axially secured solely due to the threaded connection and is encapsulated within the connection and tools.

The frame 40, which in this embodiment is of a generally cylindrical shape (although embodiments are not limited to a particular shape) defines a fluid conduit 60, which may be in the form of an inner or central bore, that provides fluid connection between the bores 20 of the string segments 14. The fluid conduit 60, in one embodiment, is a cylindrical central conduit having a diameter that is at least substantially equal to the diameter of the bores 20, although the conduit 60 can have a smaller diameter or have any shape or diameter suitable to transmit fluid between the segments 14. The frame also includes an outer surface (e.g., a cylindrical surface) that is configured to fit within the bore-back 54.

In the embodiments shown in FIGS. 4-8, the frame 40 includes two or more parts or frame elements made from a high strength material (e.g. alloy steel or superalloy), i.e., a material that can withstand temperature, pressure, fluid and operational conditions experienced downhole. The frame elements are joined together to form a housing that encapsulates the electronic components and isolates the electronic components from borehole fluids and other environmental conditions. As described herein, borehole fluids may include various liquids, gases, mixtures or liquids and gases and flowable solids. Exemplary fluids include water, hydrocarbons, drilling fluids, stimulation fluids, air and other gases, foams, sealing fluids and others.

The frame elements are mechanically joined together by a permanent mechanical joining, such as a weld or an adhesive. Exemplary welding methods include laser or electron beam welding. As described herein, "permanently joined" is defined as being joined such that the frame elements are mechanically joined via a connection that forms at least a fluid-tight seal between the elements without including a feature (e.g., bolts) that provides a mechanism for disconnecting the elements.

Figure 4A:
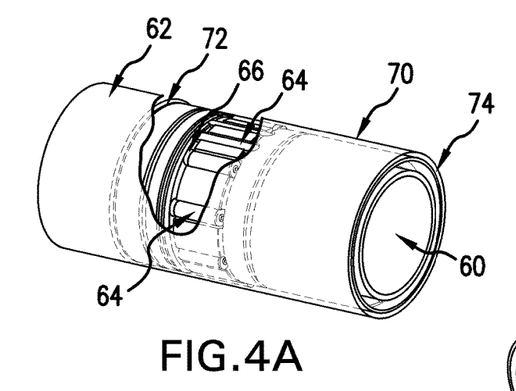
FIGS. 4A-4C (collectively referred to as FIG. 4) depict embodiments of an electronic frame for electronically coupling downhole components.
Figure 4B:
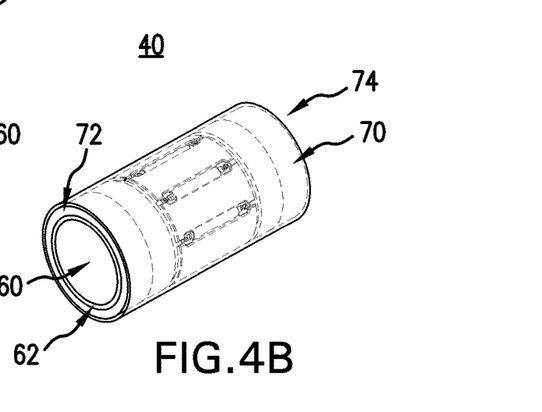
Figure 4C:
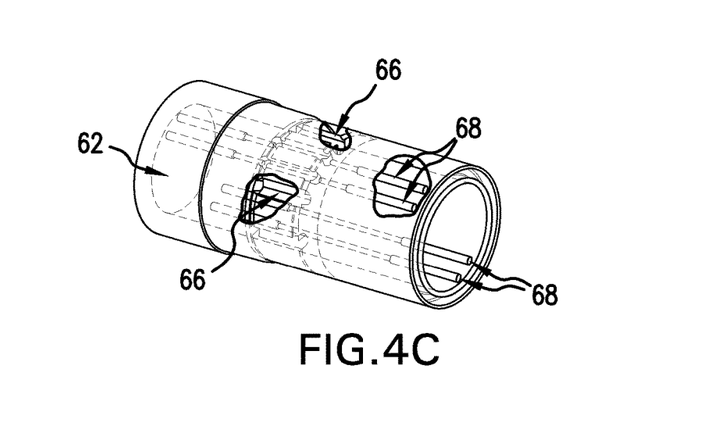

FIGS. 4A-C illustrate some embodiments of the frame 40, which include a first or main frame element and one or more second frame elements that are welded or otherwise permanently joined to the main frame element. In this embodiment, the first frame element is a main body 62 that includes a fluid conduit 60 (e.g., an inner cylindrical bore) and various retaining structures for accommodating various electronic components 64. Exemplary retaining structures include recesses or pockets 66 to accommodate electronic components such as batteries, interfaces and processing chips, and bores or channels 68 to accommodate elongated components such as connectors, cables, wires, fluid conduits and optical fibers (e.g., for direct/passive signal transmission and/or active signal transmission).

The main body 62 is joined to a second frame element, which in this embodiment is configured as a sleeve 70 (shown as transparent in FIGS. 4A and 4B), that covers and protects the electronic components 64. Various welds 72 and 74 (or other joining locations) provide a fluid-tight seal between the main body 62 and the sleeve 70. For example, as shown in FIG. 4A, an end of the sleeve 70 is welded to an annular shoulder of the main body 62 and forms an outer surface of the frame 40. The weld 72 in FIG. 4A is a radial weld and the weld 74 is an axial weld. FIG. 4B shows an embodiment that includes a single sleeve 70 that surrounds and extends axially along the length of the main body 62. The sleeve in FIG. 4B is joined to the main body 62 via axial or radial welds 72 and 74. FIG. 4C shows an embodiment of the main body 62 prior to the sleeve 70 being attached.

Figure 5A:
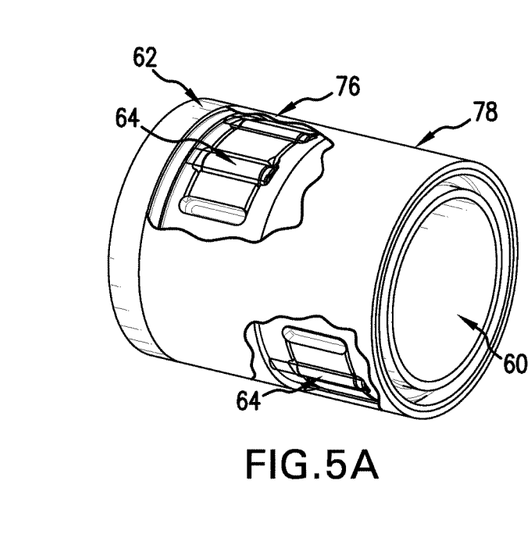
Figure 5B:
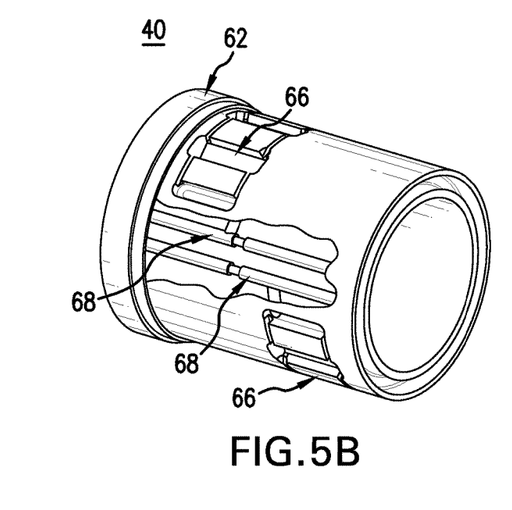
Figure 5C:
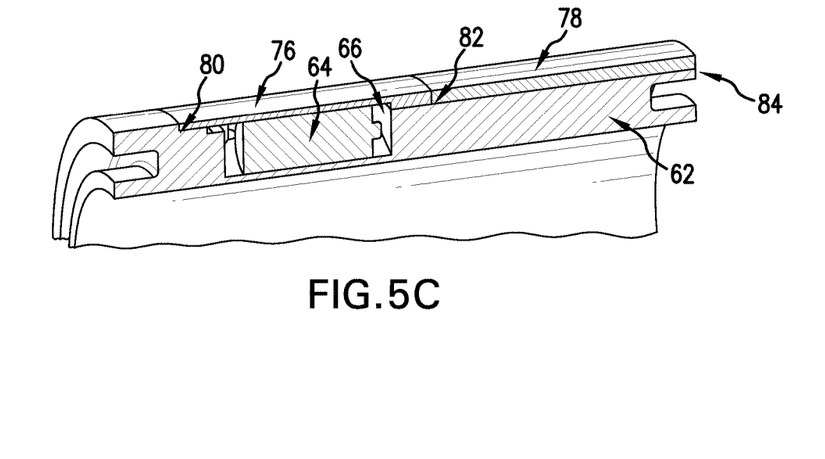

FIG. 5 illustrates an embodiment of the frame 40 that includes two second frame elements welded or joined to the main frame element, which can provide for mechanical redundancy. For example, FIG. 5A shows the main body 62 joined to sleeves 76 and 78, and FIG. 5B shows the main body 62 without the sleeves. FIG. 5C shows the sleeves 76 and 78 attached to the main body 62 via radial welds 80 and 82, and an axial weld 84.

Figure 6A:
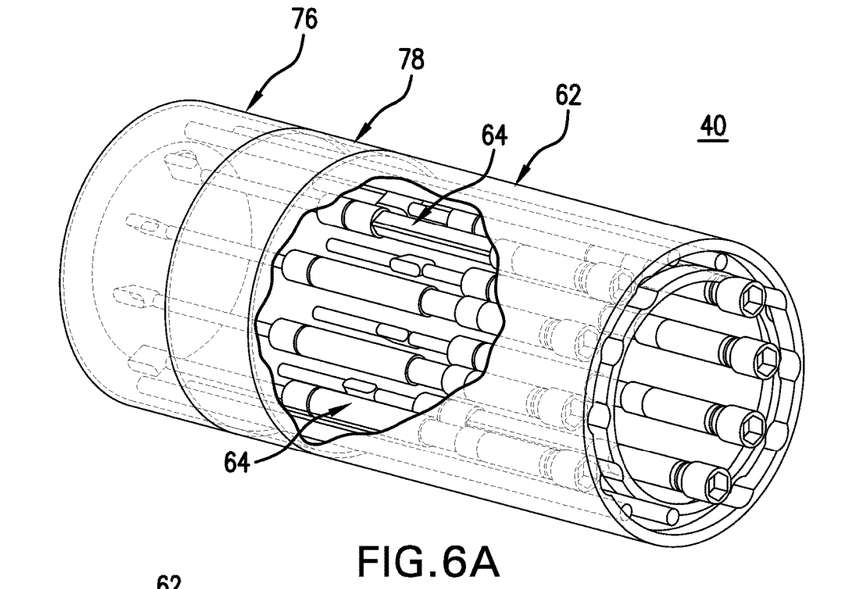
FIGS. 6A-6C (collectively referred to as FIG. 6) depict an embodiment of an electronic frame for electronically coupling downhole components.
Figure 6B:
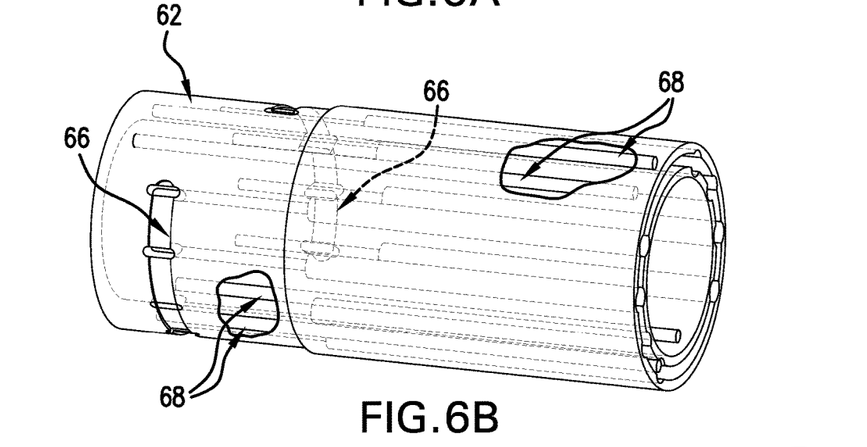
Figure 6C:
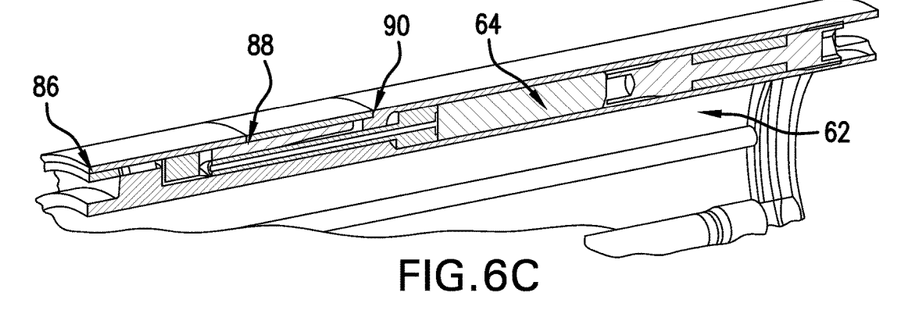

FIG. 6 illustrates another embodiment of the frame 40 that includes multiple secondary frame elements being encapsulated as well, to provide enhanced redundancy. FIG. 6A shows the assembled frame 40, FIG. 6B shows the main body 62 without the sleeves, and FIG. 6C shows a cross-section of a portion of the assembled frame 40. In this embodiment, the main body 62 includes a plurality of elastomer or polymer-sealed channels 68 extending axially therethrough. A section of the main body includes recesses 66 and has a reduced outer diameter to accommodate the sleeves 76 and 78, which are welded to each other and/or to the frame to cover and isolate the recesses 66 from the pipe segments, fluid and the downhole environment generally. For example, the sleeves 76 and 78 are joined to the main body 62 via welds 86, 88 and 90.

Figures 7A, 7B, 8:
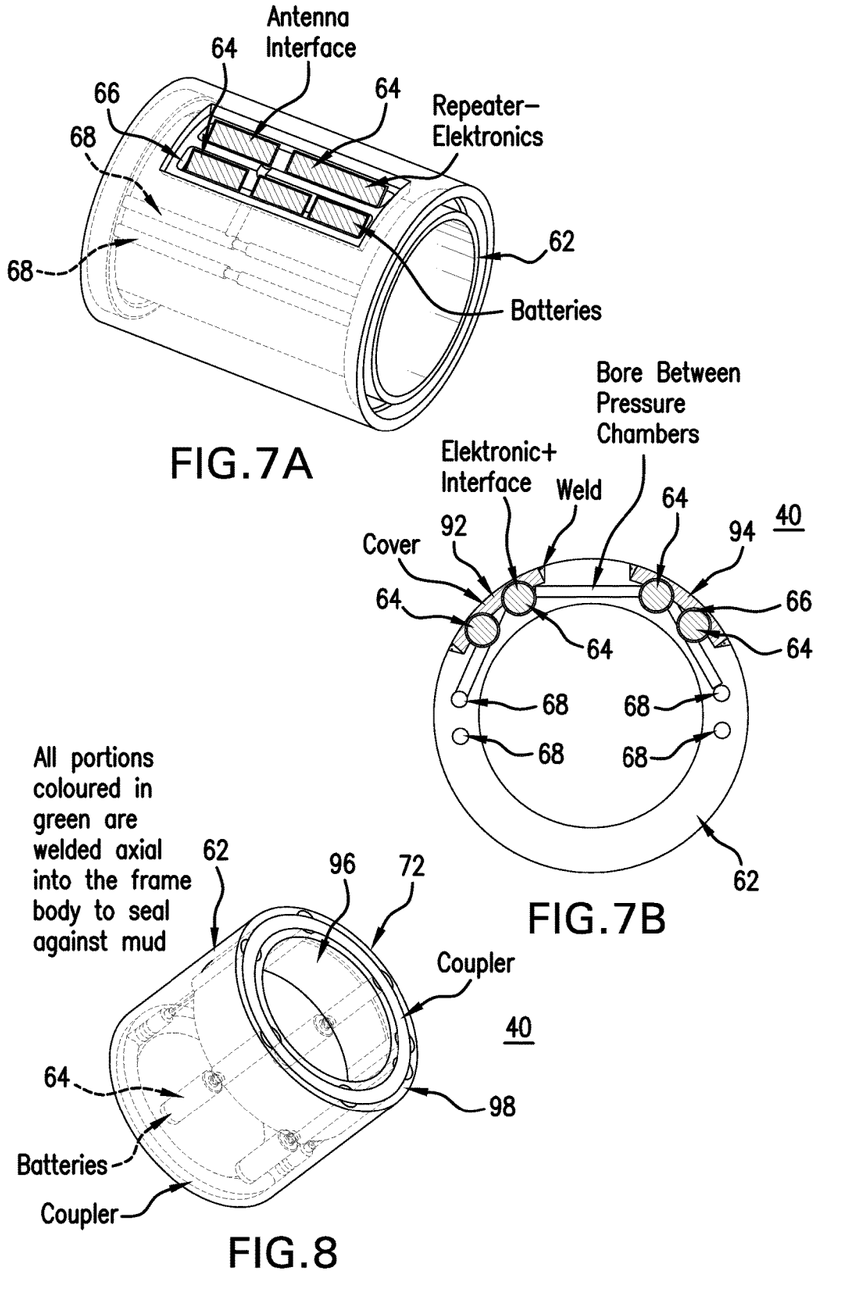
FIGS. 7A and 7B (collectively referred to as FIG. 7) depict an embodiment of an electronic frame for electronically coupling downhole components.
FIG. 8 depicts an embodiment of an electronic frame for electronically coupling downhole components.

In the embodiment shown in FIG. 7, one or more second frame elements are configured as hatch covers 92 and 94 that allow access to pockets 66 during assembly. The covers 86 and 88 are joined to the main body 62 via welds 90. In this embodiment, the hatch covers 86 and 88 are not sleeves, but are rather configured to seal a selected portion of the main body on which recesses 66 have been formed. FIG. 7A shows the main body 62 prior to assembly with the hatch covers, and FIG. 7B shows a cross section of the assembled frame. An advantage of this design is an increased stability of the housing against pressure.

Embodiments including multiple sleeves or secondary frame elements may be included to provide mechanical redundancy where desired. For example, the pockets 66 located under sleeves 76 may be equipped with the same type of electronic components as the pockets 66 under the sleeve 78 to provide redundancy in the event that one of the sleeves is damaged or the seal is compromised. Mechanical redundancy can also be achieved for the embodiment that includes the covers 86 and 88.

As demonstrated by the embodiment shown in FIG. 8, the second frame element may be equipped with channels or pockets. For example, the second frame element may be an axially-inserted inlay 96 including channels or pockets for electronic components. The inlay 96 may be inserted into the main body and joined to the main body via axial welds. In some embodiments, a coupler ring 98 may be a separate component that is welded to the main body 62 and/or the inlay 90 to seal the inlay within the main body 62. The inlay 96 may be aligned or positioned to interact with pockets or channels (e.g., for cables which connect the electronics, batteries and couplers) in the main body 62 to provide complete channels or pockets. An advantage of this embodiment is that it allows for the ability to weld or join the whole frame 40 axially with only one clamping.

In one embodiment, the second frame element is configured as a portion of the box, pin or other coupling mechanism. For example, instead of the secondary frame element being a sleeve, cover, inlay or other element that is welded to the main body prior to insertion into the pin-box connector, the main body may be welded or joined to a surface in the pin or box. An exemplary surface is a surface of the box bore-back. This design may provide an advantage with respect to manufacturing cost.

The embodiments shown in FIGS. 4-8 are exemplary and are not provided to limit the electronic frame to any particular configuration. The number, shape and type of channels or pockets is not limited. In addition, the number, type and configuration of the secondary frame elements are not limited. The main body and secondary frame may take any suitable form to provide for a welded or joined frame that can be inserted into a coupling mechanism and constrained therein. In addition, the electronic components are not limited, and may be any suitable components provided to facilitate communication or transmission between downhole components.

Figure 9:
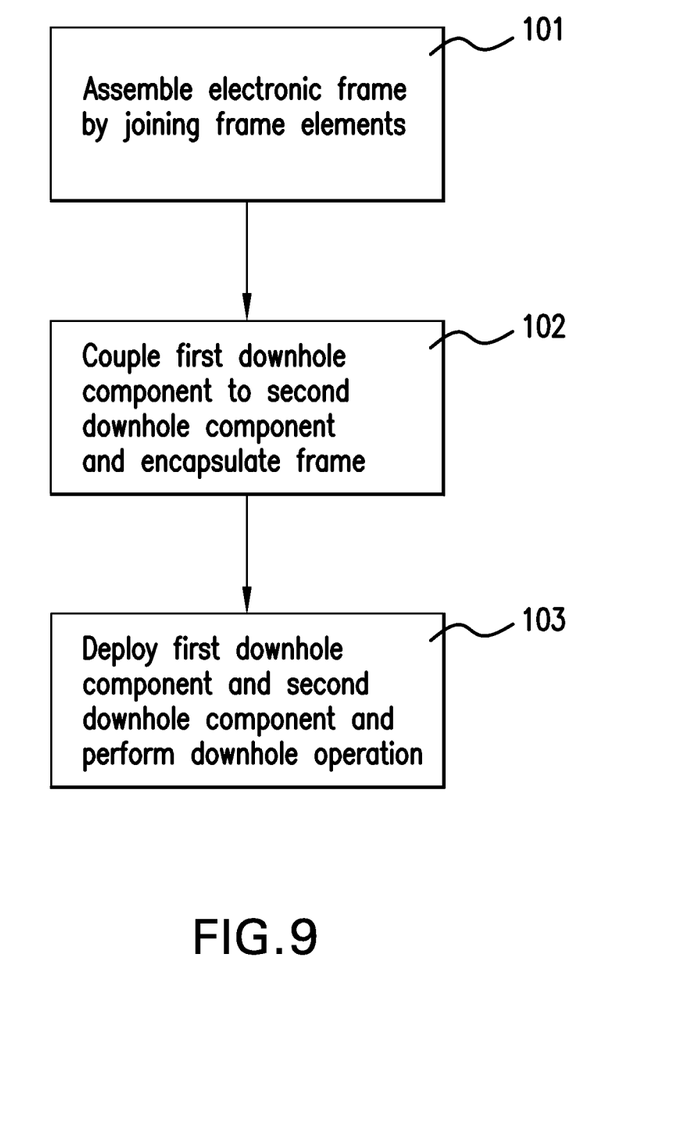
FIG. 9 depicts a flow chart providing an exemplary method of manufacturing an electronic frame, coupling segments of a borehole conduit and/or performing a downhole operation.

One embodiment of a method 100 of manufacturing an electronic frame, coupling downhole components and/or performing a downhole operation is shown in FIG. 9. The method 100 includes one or more stages 101-103. In one embodiment, the method 100 includes the execution of all of stages 101-103 in the order described. However, certain stages may be omitted, stages may be added, or the order of the stages changed.

In the first stage 61, the electronic frame is assembled. Electronic components (e.g., coupling, transmission and storage components) are disposed in various channels and/or pockets in the main body. One or more secondary frame elements are positioned to cover and isolate exposed pockets, and the secondary frame elements are welded or otherwise permanently joined to the main body. For example, referring to the embodiment of FIG. 4A, electronic components are disposed in the recesses 66 and the sleeve 70 is slid over the main body. The sleeve is welded to the main body to form the radial weld 72 and the axial weld 74.

In the second stage 62, a first downhole component is coupled to a second downhole component. The assembled frame is inserted into a portion of a coupling assembly. As described above and shown in FIG. 3, in one example, the frame 40 is inserted into the box bore-back 54, and the pin and box are assembled to encapsulate and axially restrict the frame 40. In other embodiments, the frame could be inserted into or joined to any suitable portion of the coupling assembly, such as an interior portion of the pin.

The coupling assembly is assembled around the frame to constrain the frame therein. For example, the pin end of a first component is inserted into the box end of a second component, and the pin is rotated to engage the threaded portion of the box. As shown in the example of FIG. 3, the frame 40 is thus entirely constrained within the pin-box coupling and the connected borehole string. It is noted that the frame 40 need not be rotated or angularly positioned (e.g., when an antenna or coupler ring is used on both sides of the frame), and is not necessarily restricted in the angular direction.

As noted above, the second frame element need not be separate from the downhole components or coupling assembly. For example, a frame body could be joined or welded to a surface of the coupling mechanism, e.g., the bore-back 54.

In this embodiment, the welding and coupling mechanism assemblies are combined accordingly.

Various types of joining techniques may be utilized. For example, the main body or other frame element can be joined to the secondary frame element(s) via welding or bonding. Exemplary bonding materials include heat resistant adhesives such as epoxies, silicones and urethanes.

In one embodiment, the frame elements are joined via welding. Examples of suitable welding methods include arc welding, gas welding, resistance welding and energy beam welding including laser beam welding and electron beam welding. In one embodiment, the frame elements are welded using laser or electron beam methods in order to reduce or minimize heating of the frame and mounted electronic components low In the third stage 63, the first and second downhole components (e.g., segments 14) are lowered into a borehole. The segments 14 may be lowered into the borehole during or after a drilling, completion, measurement or other downhole operation. Additional segments 14 may be connected together via, e.g., respective pins 24 and boxes 26 including a frame 40 to further lengthen the string and lower the string 12 into the borehole.

The apparatuses and methods described herein provide various advantages over existing methods and devices. For example, the electronic frame provides highly reliable housing and sealing of electronic components under high mud pressure (e.g. 30000 psi) in an inner bore as well as in the annulus and on the outer diameter of downhole equipment. The joined frame is highly rugged and robustly mounted to withstand downhole conditions (e.g., static loads, dynamic and/or shock loads and environmental conditions such as temperature and pressure). The frame also allows the high torque strength of an inner shouldered thread connection to be maintained and allows transmission of both high preloads and torque.

Connection between downhole components can be relatively easily achieved, as the frame can be easily mounted, axially fixed and dismounted within the bore-back or other portion of a coupling assembly. In addition, assembly of the frame within the coupling assembly, in some embodiments, does not require angular positioning.

The electronic frame described herein can provide reliable active and/or passive signal transmission between drill string components respectively between, e.g., mounted coupler rings (with or without galvanic contact). The frame, as shown in some embodiments, can also provide redundancy with respect to electrical failure as well as mechanical failure.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electronic frame for use in a downhole component coupling mechanism, comprising:
   a first frame element including at least one retaining structure configured to retain an electronic component, the electronic component including signal coupling elements that transmit signals between a first downhole component and a second downhole component; and
   a second frame element attached to the first frame element to form the electronic frame, encapsulate the electronic component within the electronic frame and isolate the electronic component from downhole fluids, the second frame element attached to the first frame element by a permanent and fluid-tight mechanical joining, the second frame element in a fixed rotational relationship relative to the first frame element, the electronic frame being separate and removable from a coupling assembly of the first downhole component and the second downhole component, the electronic frame configured to be encapsulated within a space formed by the coupling assembly of the first downhole component and the second downhole component, and the electronic frame having a shape that conforms to the space formed by the coupling assembly to cause the electronic frame to be constrained by the coupling assembly, wherein the coupling assembly is configured to communicatively connect the first downhole component to the second downhole component via the electronic frame.

2. The electronic frame of claim 1, further comprising a fluid conduit formed by at least one of the first frame element and the second frame element, the fluid conduit configured to provide fluid communication through the coupling assembly and between the first and second downhole component.

3. The electronic frame of claim 1, wherein the coupling assembly further includes a pin located at an end of the first downhole component and a box at an end of the second downhole component.

4. The electronic frame of claim 3, wherein the electronic frame is further configured to be disposed in a bore-back region of the box and constrained axially by the pin and the box when the downhole component coupling mechanism is assembled, the bore-back region provided to reduce stress concentrations due to loads on the coupling assembly.

5. The electronic frame of claim 1, wherein the second frame element is welded to the first frame element to provide a fluid-tight seal between the first frame element and the second frame element.

6. The electronic frame of claim 1, wherein the electronic frame is further configured to be encapsulated in the space formed by the coupling assembly without any rotationally securing feature.

7. The electronic frame of claim 6, wherein the at least one retaining structure includes at least one recess formed in a surface of the first frame element, and the second frame element includes at least one of a sleeve and a cover configured to surround at least a portion of the surface on which the at least one recess is formed.

8. The electronic frame of claim 1, wherein the second frame element includes a plurality of separate frame elements permanently joined to the first frame element.

9. The electronic frame of claim 8, wherein the at least one retaining structure includes at least one recess, the at least one recess includes at least one first recess that retains the electronic component and at least one second recess that retains a redundant electronic component, one of the plurality of separate frame elements configured to cover the first recess and another of the plurality of separate frame elements configured to cover the second recess.

10. The electronic frame of claim 1, wherein the electronic frame further includes at least one recess formed between the first frame element and the second frame element, and the electronic frame is a cylindrical structure formed by the first frame element and the second frame element, the cylindrical structure having an inner surface forming a fluid conduit that provides fluid communication between the first downhole component and the second downhole component, and an outer surface conforming to the space formed by the coupling assembly.

11. A method of coupling downhole components comprising:
disposing an electronic component in at least one retaining structure of a first frame element of an electronic frame, the electronic component including signal coupling elements that transmit signals between a first downhole component and a second downhole component;
attaching a second frame element to the first frame element by a permanent and fluid-tight mechanical joining to form the electronic frame, encapsulate the electronic component within the electronic frame and isolate the electronic component from downhole fluids, the second frame element in a fixed rotational relationship relative to the first frame element;
disposing the electronic frame in a coupling assembly of the first downhole component and the second downhole component, the electronic frame being separate and removable from the coupling assembly; and
coupling the first downhole component to the second downhole component, wherein said coupling the first downhole component to the second downhole component includes encapsulating the electronic frame within a space formed by the coupling assembly and constraining the electronic frame by the coupling assembly, wherein said coupling the first downhole component to the second downhole component further includes communicatively connecting the first downhole component to the second downhole component via the electronic frame.

12. The method of claim 11, further comprising disposing the first downhole component and the second downhole component in a borehole in an earth formation and performing a downhole operation, the downhole operation including advancing a borehole fluid between the first downhole component and the second downhole component through a fluid conduit formed by at least one of the first frame element and the second frame element.

13. The method of claim 11, wherein said coupling the first downhole component to the second downhole component further includes encapsulating the electronic frame without rotationally securing the electronic frame.

14. The method of claim 11, wherein the coupling assembly includes a pin located at an end of the first downhole component and a box at an end of the second downhole component.

15. The method of claim 14, wherein disposing the electronic frame in the coupling assembly further includes disposing the electronic frame in a bore-back region of the box, the bore-back region provided to reduce stress concentrations due to loads on the coupling assembly.

16. The method of claim 11, wherein the at least one retaining structure includes at least one recess formed in a surface of the first frame element.

17. The method of claim 16, wherein the second frame element includes at least one of a sleeve and a cover configured to surround at least a portion of the surface on which the at least one recess is formed.

18. The method of claim 11, wherein the second frame element includes a plurality of separate frame elements permanently joined to the first frame element.

19. The method of claim 18, wherein the at least one retaining structure includes at least one recess, the at least one recess includes at least one first recess that retains the electronic component and at least one second recess that retains a redundant electronic component, one of the plurality of separate frame elements configured to cover the first recess and another of the plurality of separate frame elements configured to cover the second recess.

20. The method of claim 11, wherein the electronic frame further includes electronic repeater components and a coupler ring connected to the electronic repeater components.

* * * * *